US009992251B2

(12) United States Patent
Surcouf et al.

(10) Patent No.: US 9,992,251 B2
(45) Date of Patent: Jun. 5, 2018

(54) SEGMENT ROUTING SUPPORT IN MPEG DASH

(71) Applicants: Andre Surcouf, Saint Leu la Foret (FR); William Mark Townsley, Paris (FR); Thierry Gruszka, Le Raincy (FR)

(72) Inventors: Andre Surcouf, Saint Leu la Foret (FR); William Mark Townsley, Paris (FR); Thierry Gruszka, Le Raincy (FR)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 14/640,547

(22) Filed: Mar. 6, 2015

(65) Prior Publication Data
US 2016/0021400 A1    Jan. 21, 2016

Related U.S. Application Data

(60) Provisional application No. 62/026,413, filed on Jul. 18, 2014.

(51) Int. Cl.
*H04N 7/173* (2011.01)
*H04L 29/06* (2006.01)
(Continued)

(52) U.S. Cl.
CPC ............ *H04L 65/602* (2013.01); *G06F 17/30* (2013.01); *G06F 17/30876* (2013.01);
(Continued)

(58) Field of Classification Search
CPC ............... H04N 21/238; H04N 21/239; H04N 21/2662; H04N 21/2381; H04N 21/2343;
(Continued)

(56) References Cited

U.S. PATENT DOCUMENTS 8,739,272 B1    5/2014  Cooper et al.
9,043,849 B2 *  5/2015  Yie ........................ H04H 60/73
                                                    725/116
(Continued)

FOREIGN PATENT DOCUMENTS

WO    WO 2013/098319 A1    7/2013
WO    WO 2014/102371 A1    7/2014

OTHER PUBLICATIONS

Format for Literal IPv6 Address in URL's R. Hinden Dec. 1999.*
(Continued)

*Primary Examiner* — Nasser Goodarzi
*Assistant Examiner* — An Nguyen
(74) *Attorney, Agent, or Firm* — P. Su

(57) ABSTRACT

According to one aspect, a method includes identifying a request for a piece of content, and obtaining a Moving Picture Expert Group (MPEG) Dynamic Adaptive Streaming over HTTP (DASH) manifest after identifying the request for the piece of content. The method also includes identifying at least one location at which the piece of content is located using the DASH manifest, wherein the at least one location at which the piece of content is located is a location from which the piece of content is arranged to be fetched.

21 Claims, 6 Drawing Sheets

(51) Int. Cl.

| | | |
|---|---|---|
| *H04N 21/238* | (2011.01) | |
| *H04N 21/2381* | (2011.01) | |
| *H04N 21/239* | (2011.01) | |
| *H04N 21/2662* | (2011.01) | |
| *H04N 21/61* | (2011.01) | |
| *G06F 17/30* | (2006.01) | |
| *H04N 21/262* | (2011.01) | |
| *H04N 21/658* | (2011.01) | |
| *H04N 21/845* | (2011.01) | |
| *H04L 12/741* | (2013.01) | |
| *H04L 12/725* | (2013.01) | |

(52) U.S. Cl.
CPC .......... *H04L 45/74* (2013.01); *H04L 65/4084* (2013.01); *H04N 21/238* (2013.01); *H04N 21/2381* (2013.01); *H04N 21/2393* (2013.01); *H04N 21/2662* (2013.01); *H04N 21/26258* (2013.01); *H04N 21/6125* (2013.01); *H04N 21/6581* (2013.01); *H04N 21/8456* (2013.01); *H04L 45/306* (2013.01)

(58) Field of Classification Search
CPC .......... H04N 21/2393; H04N 21/6125; H04N 21/8456; H04N 21/631; H04N 21/4126; H04N 21/2183; H04N 21/4332; H04N 21/854; H04N 21/254; H04N 21/643; H04N 21/438; H04N 21/2347; H04N 21/8358; H04N 21/2387; H04N 21/6143; H04N 21/26258; H04N 21/2543; H04N 21/23424; H04N 21/4227
USPC ... 725/93, 47, 91, 101, 116, 146, 46, 88, 59, 725/96, 28, 110, 94, 67, 118, 31, 32, 37, 725/131, 25
See application file for complete search history.

(56) References Cited

U.S. PATENT DOCUMENTS

| | | | | |
|---|---|---|---|---|
| 2004/0243667 | A1* | 12/2004 | Parham | .................. H04L 29/06 709/203 |
| 2007/0033225 | A1* | 2/2007 | Davis | ................. H04N 21/4332 |
| 2012/0259994 | A1* | 10/2012 | Gillies | ................ H04L 12/1881 709/231 |
| 2014/0019632 | A1 | 1/2014 | Fall | |
| 2014/0098675 | A1 | 4/2014 | Frost et al. | |
| 2014/0169370 | A1 | 6/2014 | Filsfils et al. | |
| 2014/0269727 | A1 | 9/2014 | Filsfils et al. | |
| 2015/0296269 | A1* | 10/2015 | Tokumo | ............... H04N 21/238 725/93 |
| 2015/0296274 | A1* | 10/2015 | Good | .................... H04N 21/84 725/93 |

OTHER PUBLICATIONS

A Universally Unique IDentifier (UUID) URN Namespace P. Leach Jul. 2005.*
Previdi et al.; IPv6 Segment Routing Header (SRH); Network Working Group Internet-Draft; Jan. 12, 2015; tools.ietf.org/pdf/draft-previdi-6man-segment-routing-header-05.pdf.
Martin et al.; IPv6 Segment Routing Use Cases; Network Working Group Internet-Draft; Mar. 6, 2014; tools.ietf.org/pdf/draft-martin-spring-segment-routing-ipv6-use-cases-00.pdf.
Mobile Competence Center; 3rd Generation Partnership Project; PTechnical Specification Group Services and System Aspects; Jun. 18, 2014; http://www.3gpp.org/ftp/tsg_sa/WG4_CODEC/.
Filsfils et al.; Segment Routing Architecture; IETF; Geneva, Switzerland; Jul. 3, 2014; pp. 1-18; XP015100062; draft-filsfils-spring-segment-routing-04.txt.
Cai et al,; Evolve Carrier Ethernet Architecture with SDN and Segment Routing; IEEE; Jun. 19, 2014; pp. 1-6; XP032656361.
Previdi et al.; IS-IS Extensions for Segment Routing; IETF; Geneva, Switzerland; Jun. 18, 2014; pp. 1-32; XP15099634; draft-ieff-isis-segment-routing-extensions-02.txt.

* cited by examiner

US 9,992,251 B2

SEGMENT ROUTING SUPPORT IN MPEG DASH

CROSS REFERENCE TO RELATED APPLICATION

This application claims the benefit of U.S. Provisional Patent Application No. 62/026,413, filed Jul. 18, 2014 and entitled "Using Segment Routing to Access Chunks of Content," which is incorporated herein by reference in its entirety.

TECHNICAL FIELD

The disclosure relates generally to delivering content within networks. More particularly, the disclosure relates to supporting segment routing with respect to Moving Picture Expert Group (MPEG) Dynamic Adaptive Streaming over HTTP (DASH).

BACKGROUND

Video delivery is typically performed by a set of servers on which video in the form of chunks is stored. When a client requests video, the client may connect to the servers and may obtain the chunks from the servers until the video is completed. The client may open multiple connections to substantially all servers that contain different chunks of a video. Obtaining video through multiple connections is not efficient, and generally utilizes significant network resources.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
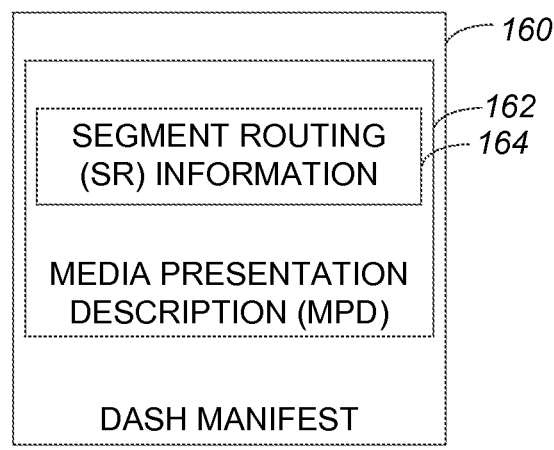
FIG. 1 is a diagrammatic representation of a Moving Picture Expert Group (MPEG) Dynamic Adaptive Streaming over HTTP (DASH) manifest in accordance with an embodiment.

In one embodiment, a method includes identifying a request for a piece of content, and obtaining a Moving Picture Expert Group (MPEG) Dynamic Adaptive Streaming over HTTP (DASH) manifest after identifying the request for the piece of content. The method also includes identifying at least one location at which the piece of content is located using the DASH manifest, wherein the at least one location at which the piece of content is located is a location from which the piece of content is arranged to be fetched.

Description

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally allow a shift from substantially centralized delivery of streaming video and single-point fetching to a data-centric object fetch approach at an inter-networking layer. As a result, more efficient streaming systems may be designed. When SR is used to enable video stored on servers to be provided to a client, a single connection may be opened and a network may handle the process of accessing video.

In one embodiment, properties of an SR architecture may be utilized to achieve a relatively simple, relatively high efficiency, and scalable streaming video system. The integration of SR allows a delivery process that is substantially automatic, highly accurate, and resilient. The ability to provide a delivery process that is substantially automatic, highly accurate, and resilient is possible because the SR may encode multiple locations for content, while the streaming video system may route the content to a correct location substantially without a host needing to know.

It should be appreciated that, herein and after, a video segment that is in a traditional approach referenced, as for example by a Universal Record Locator (URL), may be referred to as a "chunk" or a "video chunk." In addition, a segment in SR may be referred to as a "segment." Further, it should be understood that while a chunk may be a video segment, a chunk may also be an audio segment, an audio and video (AV) segment, or a segment of any content. That is, any suitable piece of content may be a chunk.

In order to play content such as video on a device, e.g., a computer system or a tablet, the device may request the video from a server that is aware of the video, e.g., a Content Delivery Network (CDN). The request for video may specify a list of chunks which effectively make up the video. A video may be divided into short chunks that are each a few seconds in length. Generally, a response to a request for video may include a description of the video. The description of the video may be sent back to, or otherwise provided to, the device. Once the device obtains the description of the video, the device may play the video by fetching or retrieving a first chunk in the list. In one embodiment, video chunks may be referenced or played by Moving Picture Expert Group (MPEG) Dynamic Adaptive Streaming over HTTP (DASH). In other words, a DASH player may play video after fetching or otherwise obtaining a chunk of video.

As will be appreciated by those skilled in the art, a DASH manifest allows a host, e.g., a video player, to obtain information about the location of a particular piece of content, e.g., a chunk of video or video chunk. In general, a DASH manifest may be a video content description. A DASH manifest may be an xml file which includes a list of URLs. By using a DASH manifest to carry SR information, or information which facilitates segment routing, the SR information may be delivered and, hence, obtained efficiently and accurately. The integration of an SR description into a DASH manifest effectively allows for a substantially automatic, accurate delivery process. Further, the integration of an SR description into a DASH manifest allows delivery of the DASH manifest to an end-user, or a recipient of the DASH manifest, to be relatively robust, as SR may encode multiple locations for content while an overall system may provide the DASH manifest based on the source of the DASH manifest to a correct location substantially transparently.

In one embodiment, SR information may be stored in a Media Presentation Description (MPD) section of a DASH manifest. It should be appreciated that SR information may be stored in a MPD section of a DASH manifest along with other information. As shown in FIG. 1, a DASH manifest 160 generally includes a MPD section 162. It should be appreciated that MPD section 162 may include any number of MPDs. SR information 164 is included in MPD section 162. As will be appreciated by those skilled in the art, a DASH manifest format is relatively flexible. Accordingly, the may be many ways in which SR information 164 may be described substantially without violating a DASH syntax. The described embodiments are examples of suitable ways in which SR information 164 may be included in DASH manifest 160.

A MPD section of a DASH manifest may generally be used to support SR information in a flexible manner. For example, a MPD section may contain information that describes a segment list such as a V6 segment list. A MPD section may include an entry that describes a chunk, and a list of addresses, e.g., IPv6 addresses, may be added to the description of the chunk. In other words, each description of a chunk included in a MPD section may include a list of addresses. Each address from the list may represent a network endpoint that may contain the chunk, e.g., the video chunk that is to be fetched or otherwise obtained.

Within a MPD section of a DASH manifest, e.g., MPD section 162 of DASH manifest 160 of FIG. 1, each chunk described in an entry in the MPD section may be augmented to include SR information, e.g., SR information 164 of FIG. 1. The SR information may generally include IPv6 addresses. That is, IPv6 addresses of segments may be associated with each chunk described by a specific entry in an MPD section of a DASH manifest. Each address may represent a network endpoint, as for example a router, which may have a particular chunk cached. In addition to IPv6 addresses of segments being added to an MPD section of a DASH manifest, a content identifier (v6CD) may also be included in the MPD section of the DASH manifest. The v6CD may be interpreted as a universally unique identifier (UUID), and is, in one embodiment, the last IPv6 address in a list of IPv6 addresses. A last address from an MPD section may be a v6CD, while other addresses in the MPD entry may effectively represent a list of locations from which content may be fetched or otherwise obtained.

By including information describing a segment list, e.g., a v6 segment list, in SR information in an MPD section of a DASH manifest, locations from which video chunks may be obtained may be readily identified, and the efficiency of delivering the video chunks may be enhanced. In one embodiment, information which describes a segment list may be included in, added to, and/or appended to each individual chunk description included in or otherwise contained in an MPD section of a DASH manifest.

Figure 2:
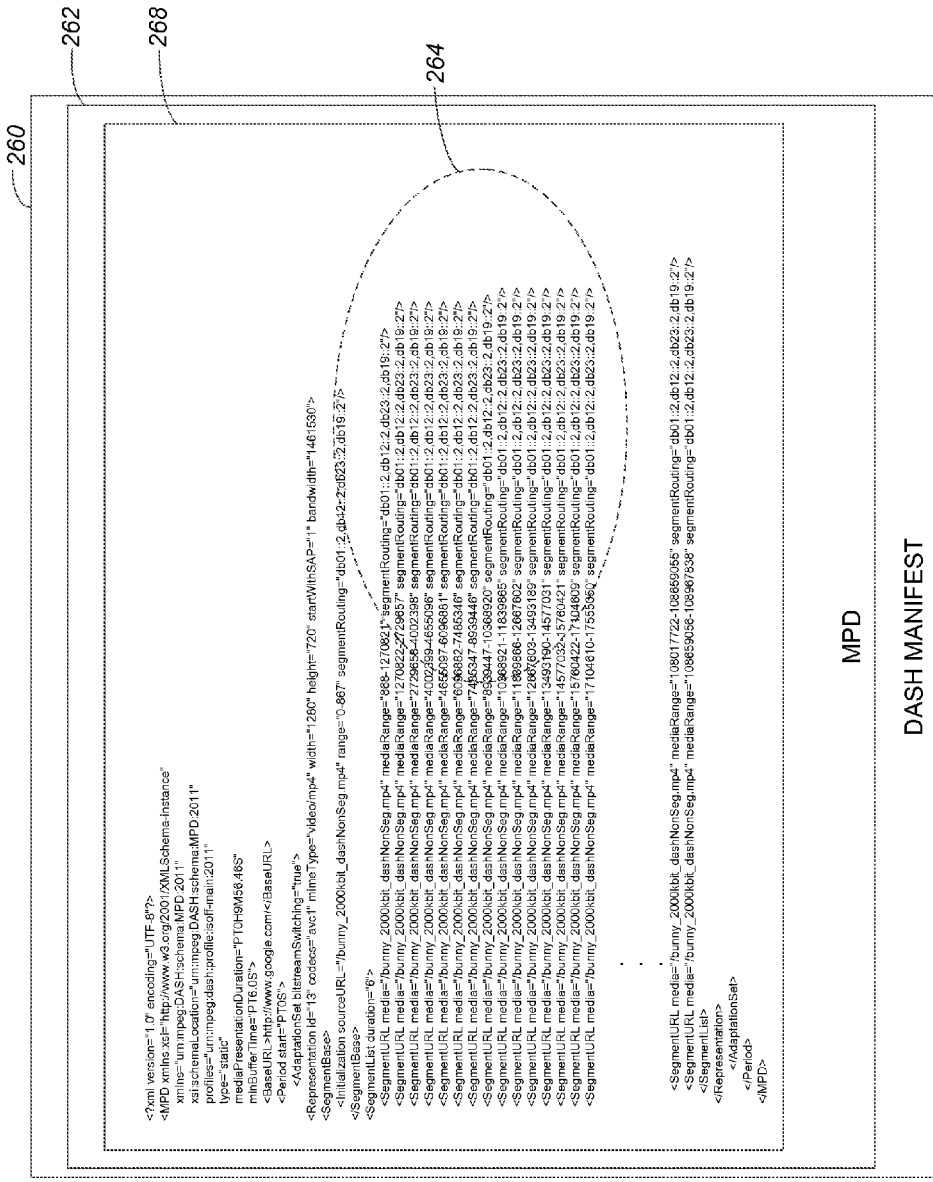
FIG. 2 is a diagrammatic representation of a DASH manifest that depicts segment routing (SR) information included in a media presentation description (MPD) section in accordance with an embodiment.

Referring next to FIG. 2, a DASH manifest that includes SR information presented in an MPD section will be described in accordance with an embodiment. A DASH manifest 260 includes an MPD section 262. MPD section 262, as shown, includes chunk descriptions 268. Chunk descriptions 268 includes SR information 264 which, in the described embodiment, includes a V6 segment list which identifies at least one location at which the chunks described in chunk descriptions 268 may be obtained or otherwise fetched. That is, each line of SR information 264 is effectively a separate chunk description. In other words, chunk descriptions 268 in DASH manifest 260 correspond to particular instances of content, e.g., a specific content quality for each instance of content, and may contain as many chunk descriptions as needed to access the content for this content quality in its entirety.

SR information 264 may be included as a "segmentRouting" entry in a "SegmentURL" section of chunk descriptions 268. As mentioned above, SR information 264 may be an ordered list of addresses, e.g., IPv6 addresses. The ordered list of addresses may be a V6 segment which identifies at least one location from which the chunk described in chunk description 268 may be obtained. In one embodiment, the last address identified in the ordered list of addresses may represent the chunk to obtain.

In the described embodiment, a "mediaRange" option is included in the "SegmentURL" section of chunk description 268. When a "mediaRange" option is used, there may be substantially only one address which represents actual content, or an actual chunk. It should be appreciated, however, that each chunk entry may generally refer to a separated address that represents the actual content, or the actual chunk.

As will be appreciated by those skilled in the art, a DASH manifest may be signed. When a DASH manifest is signed, as for example for security purposes, dynamically generating SR entries to be included as SR information in an MPD section of a DASH manifest may involve including SR entries such that the SR entries may be accessed substantially separately from the DASH manifest.

Figure 3:
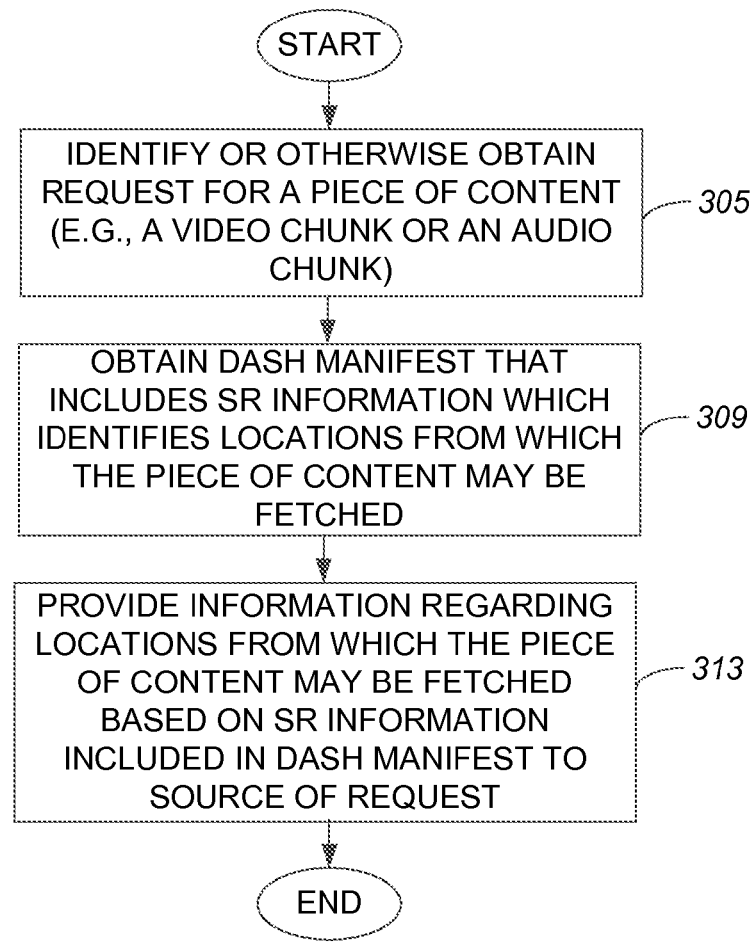
FIG. 3 is a process flow diagram which illustrates one method of obtaining the location of a piece of content, e.g., a chunk, from a DASH manifest in accordance with an embodiment.

With reference to FIG. 3, a method of obtaining information relating to a location of a piece of content, e.g., a video chunk or an audio chunk, will be described in accordance with an embodiment. A method 301 of obtaining location information begins at step 305 in which a request for a piece of content is obtained or otherwise requested. In one embodiment, an endpoint such as a video player may request a piece of content. That is, an endpoint such as a video player may be a source of a request for a piece of content.

Once a request for a piece of content is identified, a DASH manifest that corresponds to the piece of content may be obtained in step 309. The DASH manifest includes SR information which identifies locations from which the requested piece of content may be fetched. One example of a DASH manifest is shown in FIG. 2, and was previously discussed with reference to FIG. 2.

In step 309, information regarding at least one location from which the piece of content may be fetched is provided to a source of the request. Any potential locations may be identified using the SR information include in the DASH manifest. After the information regarding locations from which the piece of content may be fetched is provided, the method of obtaining information relating to the location of a piece of content is completed.

Figure 4:
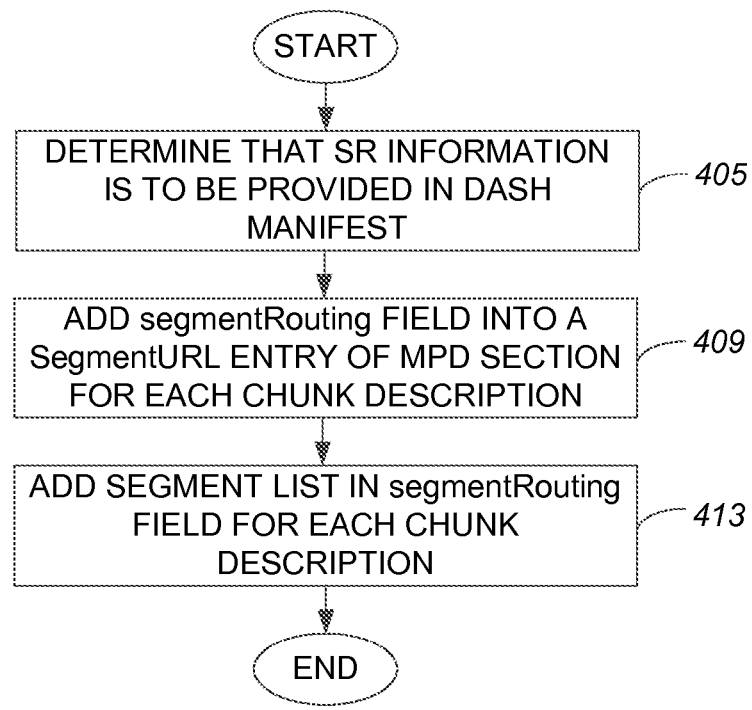
FIG. 4 is a process flow diagram which illustrates one method of generating a DASH manifest that includes SR information in accordance with an embodiment of the present invention.

FIG. 4 is a process flow diagram which illustrates one method of generating a DASH manifest that includes SR information in accordance with an embodiment of the present invention. A method 401 of generating a DASH manifest begins at step 405 in which it is determined that SR information is to be provided in a DASH manifest. Upon determining that SR information is to be provided in a DASH manifest, a "segmentRouting" field may be added into, included in, and/or appended to a "SegmentURL" entry in a DASH manifest in step 409. As will be appreciated by those skilled in the art, the "SegmentURL" entry is included in an MPD section of the DASH manifest.

After the "segmentRouting" field is added into the "SegmentURL" entry, a segment list is added into the "segmentRouting" field for each chunk description in step 413. In one embodiment, the segment list may be a list of addresses, e.g., ipv6 addresses. Once the segment list is added into the "segmentRouting" field, the method of generating a DASH manifest that includes SR information is completed.

In one embodiment, a DASH manifest may be fetched or otherwise obtained using an SR type request initiated by a device player, or a player that is to play a chunk, e.g., video chunk, identified in the DASH manifest. A content description may be limited to an SR list that may be used by a device player to fetch a DASH manifest. As previously mentioned, a last address in an SR list describing DASH manifest content may be a content descriptor such as a V6 content descriptor.

When a device fetches or otherwise obtains a chunk, e.g., a first chunk from a list representing any suitable content such as video content, rather than opening a TCP connection towards a particular server such as an HTTP server, the device may send a packet with a segment routing header that is populated with a list of addresses attached to a chunk entry from a description such as a video description. The packet may then be sent along a path, or along segments in a path. If an endpoint, e.g., a router, along the path traversed by the packet determines that it has the chunk requested by the device, the endpoint may terminate traffic and send or otherwise provide the requested chunk to the device.

An endpoint, as for example a router, configured to determine when it has a chunk requested by a device and configured to provide the requested chunk to the device is typically arranged to intercept and to interpret a packet provided by the device. That is, a router may intercept and interpret a packet obtained from a device to ascertain whether the router has a chunk requested in the packet. Such a router may generally identify a requested chunk using any suitable method.

Figure 5:
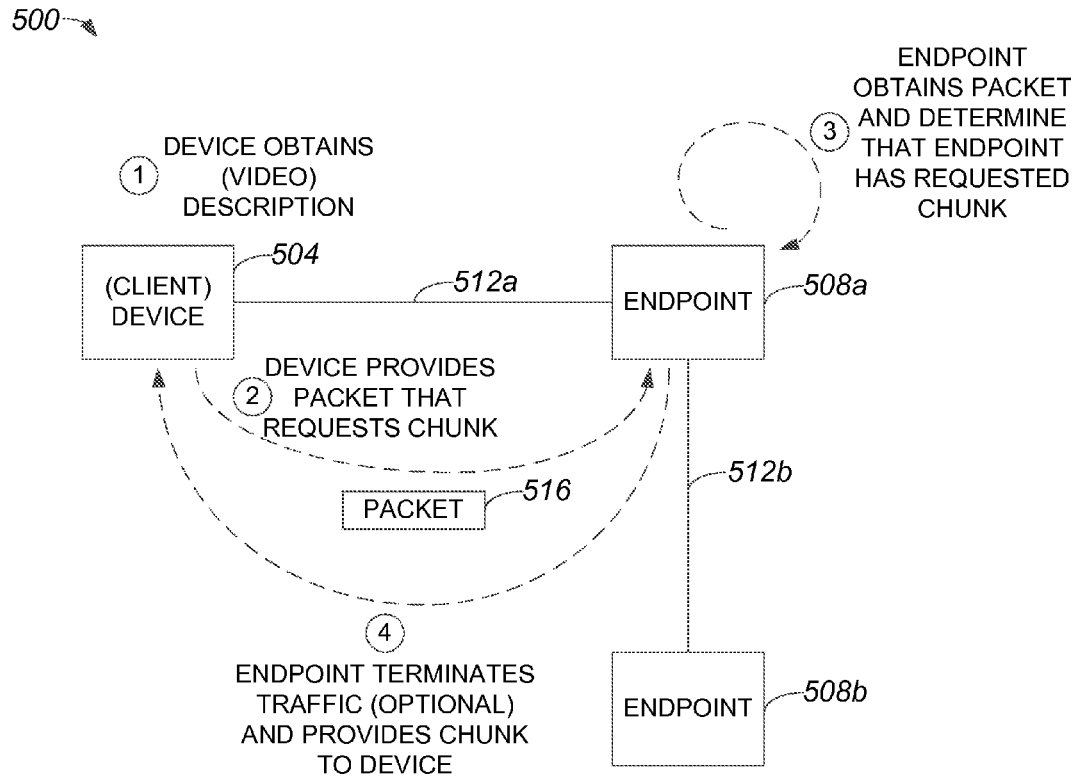
FIG. 5 is a diagrammatic representation of a network in which segment routing may be used to access chunks of content, e.g., video content, in accordance with an embodiment.

FIG. 5 is a diagrammatic representation of a network in which segment routing may be used to access chunks of content, e.g., video, in accordance with an embodiment. A network 500, which may behave as a dynamic CDN, includes device 504 and a plurality of endpoints 508a, 508b. Device 504, which may be any suitable device that is used to obtain and to play content such as video, may communicate with endpoints 508a, 508b through segments 512a, 512b. Endpoints 508a, 508b may be servers configured to store content such as video content or video chunks.

At a time t1, device 504 may obtain a video description. The video description may be obtained in response to a request for a description of the video. Upon obtaining the video description, device 504 may provide a packet 516 that requests at least one chunk of the video at a time t2. Packet 516 may be provided to endpoint 508a via segment 512a.

Once packet 516 is obtained by endpoint 508a, endpoint 508a ascertains at a time t3 whether endpoint 508a contains a chunk of video requested in packet 516. In the described embodiment, endpoint 508a determines that endpoint 508a contains the chunk of video requested in packet 516. As such, endpoint 508a provides the chunk of video requested in packet 516 to device 504, as for example through segment 512a. In addition to providing the requested chunk to packet 516, endpoint 508a may also typically terminate traffic from device 504. It should be understood, however, that endpoint 508a may not necessarily terminate traffic from device 504, as for example when endpoint 508a does not contain a requested chunk of video or is otherwise unable to deliver the requested chunk.

Figure 6:
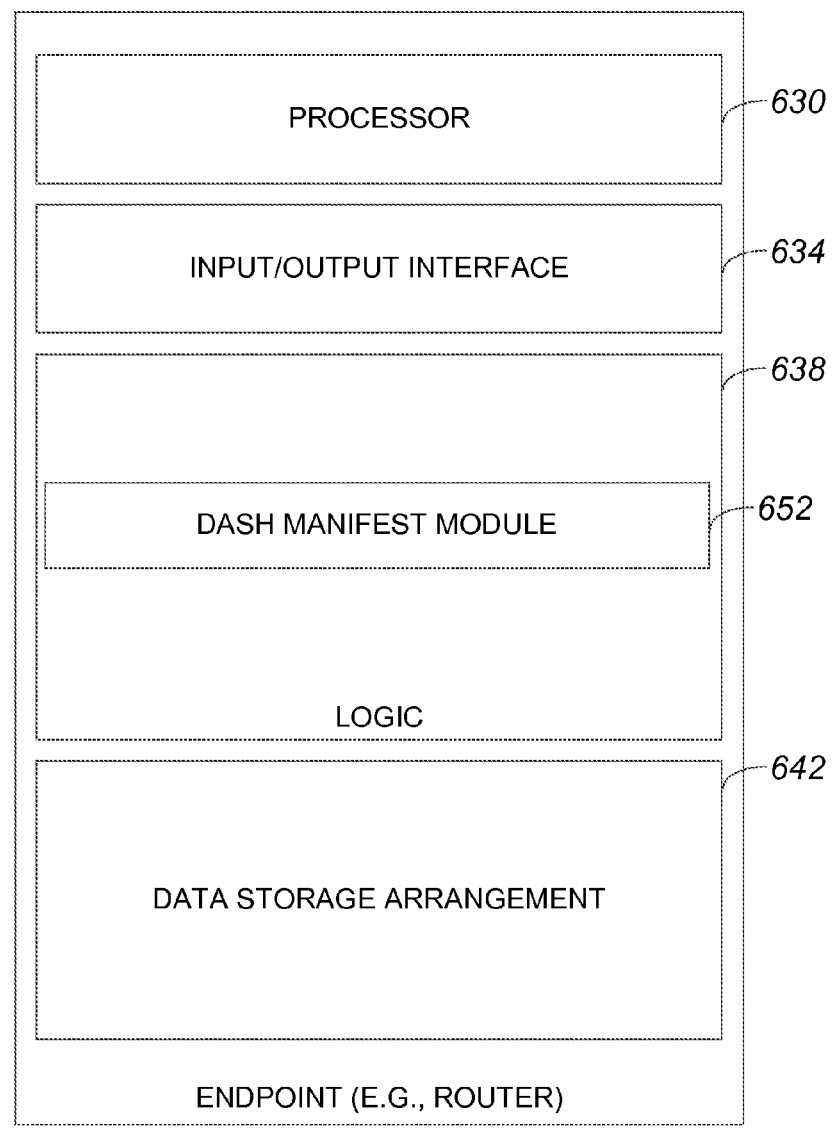
FIG. 6 is a diagrammatic representation of a network node or network endpoint, e.g., a router, in accordance with an embodiment.

With reference to FIG. 6, one embodiment of a node or an endpoint that utilizes segment routing as supported in MPEG DASH will be described. A node or an endpoint 608, which may be a router in one embodiment, includes a processor 630, an input/output (I/O) interface 634, logic 638, and a data storage arrangement 642. Processor 630 is arranged to execute software logic included in logic 638. I/O interface 634 allows endpoint 608 to communicate in a network, e.g., to obtain packets from and to provide chunks to a client or a device.

Logic 638 includes a DASH manifest module 652. DASH manifest module 652 is generally configured to support, e.g., to generate and/or to process, a DASH manifest with an MPD section that includes SR information. Data storage arrangement 642, which may be a database, is arranged to store information used by node 608. Such information may include, but is not limited to including, SR information and/or chunks.

Although only a few embodiments have been described in this disclosure, it should be understood that the disclosure may be embodied in many other specific forms without departing from the spirit or the scope of the present disclosure. By way of example, while a DASH manifest may be used to provide a client or a device requesting video with SR information, other methods and protocols may be used to provide SR information to a client or a device.

The present disclosure has been described in the context of IPv6. It should be appreciated that the present disclosure is not limited to being used in the context of IPv6, and that the present invention may be applied to other Internet Protocols.

In one embodiment, as mentioned above, a DASH manifest may be signed. It should be appreciated that in lieu of signing each chunk described in the DASH manifest for security purposes, the DASH manifest itself may be signed, or there may be a reference in the MPD section of the DASH manifest which indicates that the chunks are effectively secure.

It should be appreciated that methods of the disclosure may be applied to any suitable content. Suitable content may include, but is not limited to including, video content, AV content, and/or classified traffic and policy. As such, an SR header in a packet may be used to effectively express an intent relating to data that may be obtained and followed by a network. Traffic may be classified by a network, or by an application. In one embodiment, instances of applications may effectively be classified as types of content.

A "segmentURL" entry, as included in an MPD section of a DASH manifest as described above with respect to FIG. 2, includes a "segmentRouting" field in which SR information is included. The SR information may be a segment list. It should be understood that for systems, e.g., DASH players, which do not use information contained in a "segmentRouting" field, the contents of the "segmentRouting" field may be substantially ignored. In one embodiment, for a system, e.g., a DASH player, which uses the information contained in a "segmentRouting" field, contents of a "BaseURL" field which are typically present in a DASH manifest may be ignored.

A DASH manifest has generally been described as including an MPD section in which SR information may be stored. As mentioned above, an MPD section may include any number of MPDs. In one embodiment, a DASH manifest which includes a MPD section with a single MPD may, itself, be referred to as an MPD.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   identifying a request for a piece of content, the request being obtained from a media player, the media player being a Dynamic Adaptive Streaming over HTTP (DASH) player, the request being identified by an endpoint in communication with the media player on a network, the endpoint being a router;
   obtaining a Moving Picture Expert Group (MPEG) DASH manifest after identifying the request for the piece of content, wherein the DASH manifest is obtained by the endpoint;
   identifying at least one location at which the piece of content is located using the DASH manifest, the at least one location being identified by the endpoint, wherein the at least one location at which the piece of content is located is a location from which the piece of content is arranged to be fetched, the at least one location being included in segment routing information carried in the DASH manifest, and wherein identifying the at least one location includes identifying a last address in an ordered list of addresses included in the DASH manifest, the last address being a universally unique identifier (UUID); and
   providing information regarding the at least one location from the endpoint to the media player, wherein providing the information allows the media player to retrieve the piece of content from the at least one location.

2. The method of claim 1 wherein the piece of content is a video chunk, and wherein the segment routing information carried in the DASH manifest is carried in a Media Presentation Description (MPD) section of the DASH manifest as part of a description of the video chunk.

3. The method of claim 1 wherein the piece of content is an audio chunk.

4. The method of claim 1 wherein the DASH manifest includes a Media Presentation Description (MPD) section, and wherein the at least one location is included in the MPD section.

5. The method of claim 4 wherein the MPD section includes the segment routing information.

6. The method of claim 5 wherein the MPD section includes at least one chunk description, and wherein the segment routing information is included in the at least one chunk description.

7. The method of claim 5 wherein the segment routing information is a segment list.

8. The method of claim 7 wherein the segment list is a list of ipv6 addresses, the list of ipv6 addresses being the ordered list of addresses, and wherein the last ipv6 address in the segment list represents the at least one location.

9. Logic encoded in one or more tangible non-transitory, computer-readable media for execution and when executed operable to:
   identify a request for a piece of content, the request being obtained from a media player, the media player being a Dynamic Adaptive Streaming over HTTP (DASH) player, the request being identified by an endpoint in communication with the media player on a network;
   obtain a Moving Picture Expert Group (MPEG) DASH manifest after the request for the piece of content is identified included in the DASH manifest, wherein the DASH manifest is obtained by the endpoint, the endpoint being a router;
   identify at least one location at which the piece of content is located using the DASH manifest, the at least one location being identified by the endpoint, wherein the at least one location at which the piece of content is located is a location from which the piece of content is arranged to be fetched, the at least one location being included in segment routing information, and wherein the computer-readable media operable to identify the at least one location is operable to identify a last address in an ordered list of addresses, the last address being a universally unique identifier (UUID); and
   provide information regarding the at least one location to the media player from the endpoint.

10. The logic of claim 9 wherein the piece of content is a video chunk, and wherein the segment routing information carried in the DASH manifest is carried in a Media Presentation Description (MPD) section of the DASH manifest as part of an entry that describes of the video chunk.

11. The logic of claim 9 wherein the piece of content is an audio chunk.

12. The logic of claim 9 wherein the DASH manifest includes a Media Presentation Description (MPD) section, and wherein the at least one location is included in the MPD section.

13. The logic of claim 12 wherein the MPD section includes the segment routing information.

14. The logic of claim 13 wherein the MPD section includes at least one chunk description, and wherein the segment routing information is included in the at least one chunk description.

15. The logic of claim 13 wherein the segment routing information is a segment list.

16. The logic of claim 15 wherein the segment list is a list of ipv6 addresses, the list of ipv6 addresses being the ordered list of addresses, and wherein the last ipv6 address in the segment list represents the at least one location.

17. An apparatus comprising:
a processor;
an input/output interface; and
logic embodied as computer program code in a non-transitory computer-readable medium, the computer program code configured to be executed by the processor, the computer program code further configured to obtain a request for a piece of content from a media player over the input/output interface, to obtain a Moving Picture Expert Group (MPEG) Dynamic Adaptive Streaming over HTTP (DASH) manifest after the request for the piece of content is identified, the media player being a DASH player, and to identify at least one location at which the piece of content is located using the DASH manifest, wherein the at least one location at which the piece of content is located is a location from which the piece of content is arranged to be fetched, the at least one location being included in segment routing information, wherein including the at least one location in the segment routing information allows the content to be routed without a host being aware, and wherein the computer program code configured to identify the at least one location is configured to identify a last address in an ordered list of addresses included in the DASH manifest, the last address being a universally unique identifier (UUID).

18. The apparatus of claim 17 wherein the piece of content is one selected from a group including a video chunk and an audio chunk.

19. The apparatus of claim 17 wherein the DASH manifest includes a Media Presentation Description (MPD) section, and wherein the at least one location is included in the MPD section.

20. The apparatus of claim 19 wherein the MPD section includes the segment routing information.

21. A router that utilizes segment routing, the router comprising:
a processor;
an input/output interface arranged to allow the router to communicate on a network; and
logic embodied as computer program code in a non-transitory computer-readable medium, the computer program code configured to be executed by the processor, the logic including a Moving Picture Expert Group (MPEG) Dynamic Adaptive Streaming over HTTP (DASH) manifest module, the DASH manifest module being arranged to generate and to process a DASH manifest with a Media Presentation Description (MPD) section that includes segment routing information associated with a chunk, wherein the segment routing information associated with the chunk is included in an entry in the MPD section arranged to describe the chunk such that the MPD section may be accessed to identify a location from which the chunk may be delivered, wherein the segment routing information includes at least one address that represents the location from which the chunk is obtainable.

* * * * *